United States Patent [19]

Urano

[11] 4,393,821
[45] Jul. 19, 1983

[54] CYLINDER OR CYLINDER LINER

[75] Inventor: Shigeru Urano, Omiya, Japan

[73] Assignee: Nippon Piston Ring Co., Ltd., Tokyo, Japan

[21] Appl. No.: 151,064

[22] Filed: May 19, 1980

[30] Foreign Application Priority Data

May 22, 1979 [JP] Japan .................................. 54-62198

[51] Int. Cl.³ .............................................. F02F 1/00
[52] U.S. Cl. ................. 123/195 C; 123/668; 29/156.7 R; 277/224
[58] Field of Search ......... 123/193 R, 193 C, 193 CP, 123/193 P, 668, 669; 277/216, 224, DIG. 6; 29/156.7

[56] References Cited

U.S. PATENT DOCUMENTS

| | | | |
|---|---|---|---|
| 3,560,006 | 2/1971 | Watanabe | 277/224 |
| 3,620,137 | 11/1971 | Prasse | 123/193 C |
| 3,814,447 | 6/1974 | Prasse et al. | 277/224 |
| 4,059,876 | 11/1977 | Ditto | 29/156.7 A |
| 4,182,299 | 1/1980 | Earle et al. | 29/156.7 R |
| 4,307,890 | 12/1981 | Cromwell et al. | 277/224 |

FOREIGN PATENT DOCUMENTS 114525  2/1942  Australia .......................... 123/193 C

*Primary Examiner*—Craig R. Feinberg
*Attorney, Agent, or Firm*—Sughrue, Mion, Zinn, MacPeak and Seas

[57] ABSTRACT

An internal combustion engine including a piston and cylinder liner in which the cylinder liner is provided with plural annular hardened layers formed on the inner peripheral surface thereof in the vicinity of the top dead center of the piston. The distance between adjacent ones of the annular hardened layers is smaller than the axial length of a piston ring employed with the piston. The width of each of the hardened layers is in a range of from one-half to twice the axial length of the piston ring. The hardened layers may be formed by hardening with a laser beam. The piston ring can be provided with a hardened layer on its outer surface. The piston ring preferably has a barrel shape.

6 Claims, 5 Drawing Figures

CYLINDER OR CYLINDER LINER

BACKGROUND OF THE INVENTION

The present invention relates to cylinders or cylinder liners, hereinafter referred to merely as "liners" when applicable, in an internal combustion engine. More particularly, the invention relates to liners intended for use in diesel engines or compression-ignition type internal combustion engines which operate under severe working conditions for long periods of time.

It is a present day goal to increase the service life of a diesel engine to 700,000 to 1,000,000 km. However, in order to achieve this objective, it is first necessary to solve a problem relating to combustion gas blowing through between the liner and the piston ring of the engine after the engine has been used for more than a half of its service life. That is, the engine suffers from the effects of "blow-by". This phenomenon occurs because the surface of the liner has become so smooth as to be essentially a mirror surface or both of the piston ring and the liner have become considerably worn after the engine has been operated for more than about a half of its service life.

Accordingly, an object of the invention is to provide a liner for an internal combustion engine with which the amount of wear of the liner and a piston ring used therewith are considerably reduced, thereby to positively prevent the occurrence of blow by.

In general, in a cylinder of an internal combustion engine, a region close to the top dead center of the piston is worn out first because not only the combustion gas pressure and the temperature are highest there but also the lubricating conditions are most severe. Accordingly, the phenomena of scuffing and blow-by are liable to occur at the region of the cylinder.

Heretofore, in order to eliminate the above-described difficulties, a liner has been used of which the wear-resistance has been increased by covering with a sprayed layer, plating or hardening to prevent wear of the aforementioned region of the cylinder. The application of such a liner is advantageous in that wear-resistance is improved. However, it is still disadvantageous in that the occurrence of blow-by still is not sufficiently prevented after the engine has been operated for a long period of time. That is, in the case where the region close to the top dead center is completely and uniformly treated to increase it wear-resistivity, a frictional wear differential or wear step is formed between the surface of this region and the adjoining regions. This may result in the occurrence of blow-by. Even with a liner which is hardened in the form of a spiral or spots with a laser beam or the like, the formation of a frictional step cannot be avoided and, accordingly, it is still not possible to prevent blow-by.

SUMMARY OF THE INVENTION

The liner according to the invention effectively prevents the occurrence of blow-by and yet has excellent wear-resistivity.

In accordance with the invention, a cylinder or a cylinder liner in an internal combustion engine is provided with a plurality of annular hardened layers which are formed in the inner peripheral surface thereof in the vicinity of the top dead center of the piston with the distance between adjacent annular hardened layers being smaller than the axial length of a piston ring.

DESCRIPTION OF THE PREFERRED EMBODIMENTS

Figure 1:
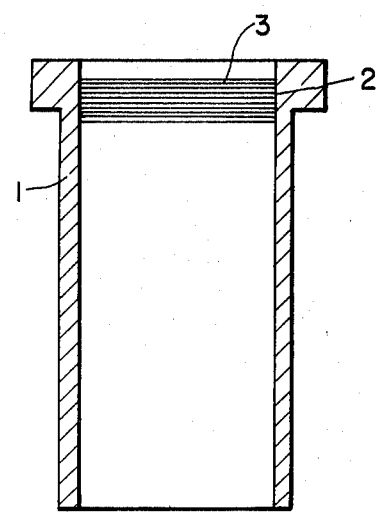
FIG. 1 is a sectional view of a preferred embodiment of a liner according to this invention.

The invention will be described with reference to the accompanying drawings. FIG. 1 is a sectional view of a preferred embodiment of a liner according to the invention. A plurality of annular hardened layers 3 are provided in a region 2 of the inner wall surface of the liner 1 close to the top dead center of the piston.

Figure 2:
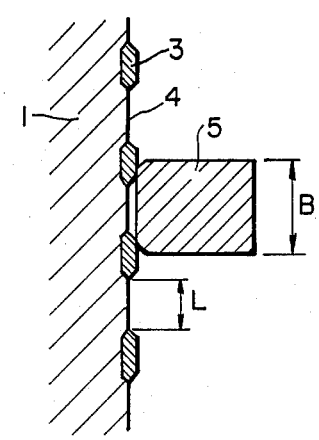
FIG. 2 is a sectional view showing essential components of the liner of the invention with a piston ring.

The positional relationship between the liner and a piston ring in this region is shown in FIG. 2. More specifically, FIG. 2 shows the conditions of the piston ring and the liner which are observed after the engine has been used for more than a half of its service life. Because of the resiliency of the base body of the liner 1 and the torsional action of the piston ring 5, the amount of wear of each hardened layer 3 is different from that of liner wall portions 4 between adjacent hardened layers 3. That is, a frictional step is provided between the hardened layer and the liner wall portions 4. The depth of the frictional step is general from several microns to about fifteen microns. Because of this frictional step, the liner wall portions 4 form recesses which hold lubricant. Due to the composite effect of the hardened layers 3 having an excellent wear-resistance and the liner wall portions 4 holding lubricant, the liner has a quite excellent wear-resistance.

The axial length B of the piston ring 5 is longer than the length L of each liner wall portion 4 between adjacent hardened layers 3 (L<B) so that the piston ring 5 is in contact with one or two hardened layers 3 at all times. More specifically, the piston ring is in annular line contact with the hardened layer or the piston ring is in planar contact with the hardened layers over a small distance. Therefore, the sealability which is thereby provided is very high and the effects of blow-by are greatly reduced.

It is desirable that the axial length B of the piston ring 5 and the length L of the liner wall portions 4 satisfy the following condition:

$$0.3B \leq L \leq 0.9B.$$

If the length L is excessively short, then the amount of lubricant held by the liner wall portions 4 will be so small that the scuffing resistivity and wear-resistivity provided are insufficient.

The above-described hardened layers of the liner according to the invention can be provided by hardening the inner wall surface of the liner utilizing an induction type heating technique or by covering the surface with sprayed layers. However, it is most suitable to form the hardened layer by irradiating the inner wall surface of the liner with a laser beam as hardened layers formed by laser beam irradiation have precise dimensions and a very small width.

The diameter of a laser beam can be adjusted to values within a range of several centimeters to several millimeters. For hardening a liner, in accordance with the invention, the diameter (d) of the laser beam is selected to be within a range of from a half of the axial length B of the piston ring to twice the axial length B. If the laser beam diameter is excessively small, then the wear-resistivity and sealability are reduced. If on the other hand the laser beam diameter is excessively large, then it is difficult to obtain a sufficient radial hardening depth which reduces the wear-resistivity and the hardened area will be excessively large which decreases the lubricating effect. These difficulties of course depend on the output of the laser beam. In general, the depth of the hardened layer should be 0.3 to 1 mm, depending on the laser beam output. Hardened layers can be provided for a liner in a large engine having the above-described width and depth by employing heat-induction hardening or spraying as well as the laser beam hardening.

Figure 3:
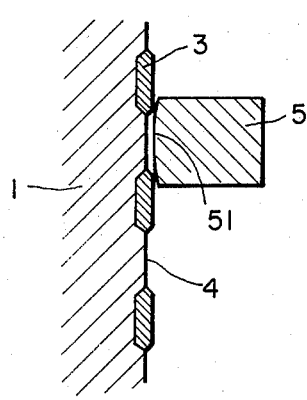
FIGS. 3 and 4 are sectional views showing two embodiments of a combination of the liner of the invention and a piston ring.
Figure 4:
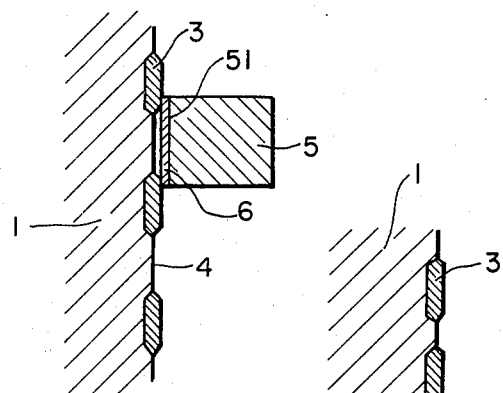

The liner constructed according to the invention is especially effective when used with a piston ring as shown in FIG. 3 or 4. The piston ring shown in FIG. 3 has an outer peripheral surface 51 having the shape of a barrel. The piston ring shown in FIG. 4 has a hard layer 6 which is formed on the outer peripheral surface by chromium plating, spraying, cementation, laser beam hardening, or the like. A piston ring having an outer peripheral surface in the form of a barrel as shown in FIG. 3 has excellent initial break-in characteristics. When this piston ring is used with the liner of the invention, the sealability is remarkably improved because the sliding surface between the hardened layers 3 and the outer peripheral surface 51 of the piston ring 5 is in the form of an annular line. That is, the hardened layers are in annular line contact with the piston ring.

In the piston ring shown in FIG. 4, the hard layer 6 is formed on a part of the outer peripheral surface or over the entire outer peripheral surface in order to improve the wear-resistivity of the piston ring. When this piston ring is used with the liner of the invention, the sliding characteristics of the piston ring with respect to the liner are maintained stable and therefore the effects of blow-by are reduced. As is now believed clear, if the liner of the invention is used with a piston ring having an outer peripheral surface with a barrel shape the piston ring is provided with a hard layer as described above, the effects of blow-by are considerably decreased.

Figure 5:
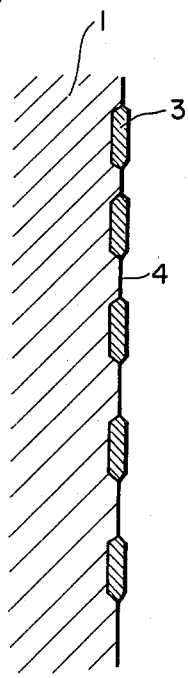
FIG. 5 is a sectional view showing another embodiment of the invention.

The axial length of each of the hardened layers provided in the vicinity of the top dead center or the clearance (axial distance) between adjacent hardened layers may be adjusted depending on the operating conditions of the engine. For an engine operating under a high load, it is essential that the axial length of the region occupied by the hardened layers be relatively long. The axial length of the region is preferably ⅓ to 1/30 of the piston stroke length. Furthermore, in order to reduce the consumption of lubricant, the distance between adjacent hardened layers may be decreased as shown in FIG. 5 so as to reduce the amount of lubricant retained. The lengths of the liner wall portions 4 are made longer towards the bottom dead center so as to control the consumption of lubricant. If to the contrary the clearances 4 are made longer towards the top dead center, depending on the operating condition of the engine, the lubricating conditions at the top dead center can be remarkably improved thereby improving the scuffing resistivity.

As is apparent from the above description, the cylinder and the cylinder liner according to the invention have excellent long-term wear-resistivity and produce markedly reduced blow-by. Furthermore, when the liner of the invention is used with a piston ring whose outer peripheral surface has a barrel shape or which has a hard layer then the effects of blow-by are further greatly reduced.

What is claimed is:

1. An internal combustion engine comprising: a piston, a cylinder and a cylinder liner, said piston being operatively disposed in said cylinder, said cylinder liner having a plurality of spaced separate annular hardened layers produced directly from the cylinder liner without discontinuity, on the inner peripheral surface of said liner in the vicinity of the top dead center of said piston, the distance between adjacent annular hardened layers being smaller than an axial length of a piston ring of said piston.

2. The internal combustion engine as claimed in claim 1 wherein said hardened layers comprise annular inner wall surface portions of said liner hardened with a laser beam and, the width of each of said hardened layers is in a range of from a half of said axial length of said piston ring to twice said axial length.

3. The internal combustion engine as claimed in claim 1 wherein said piston ring has an outer peripheral surface having a barrel shape and having an outer hard layer covering at least a portion of said outer peripheral surface.

4. The internal combustion engine as claimed in any of claims 1, 2, or 3 wherein the distances between ones of said hardened layers gradually increase in axial length towards the top dead center of said piston.

5. The internal combustion engine as claimed in any of claims 1, 2, or 3 wherein the distances between ones of said hardened layers gradually decrease in axial length towards the top dead center of said piston.

6. The internal combustion engine as claimed in any of claims 1, 2, or 3 wherein said distance between adjacent annular hardened layers is in a range of from 30% to 90% of the axial length of said piston ring.

* * * * *